Figure 1:
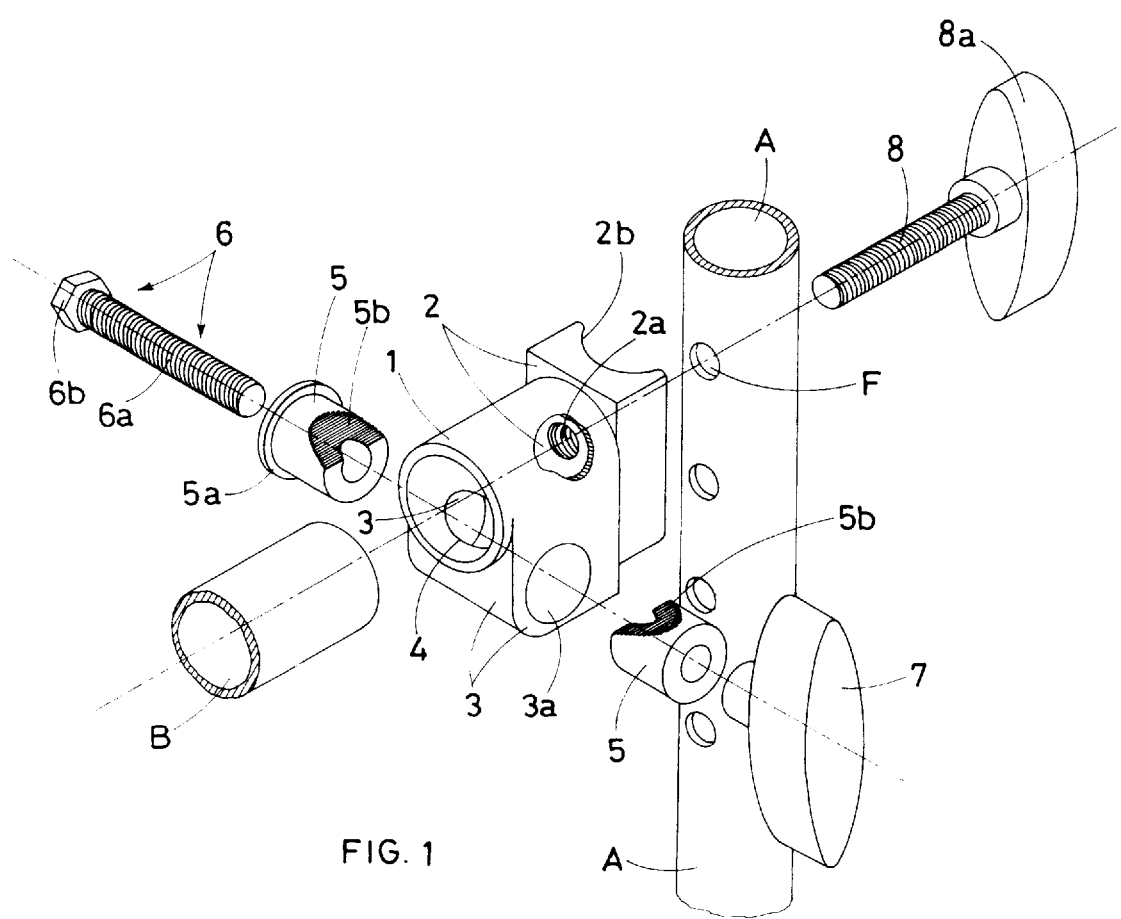

United States Patent
Malizia

[11] Patent Number: 6,030,142
[45] Date of Patent: Feb. 29, 2000

[54] COUPLING FOR CONNECTING TWO PERPENDICULAR RODS

[75] Inventor: Mario Malizia, Castelfidardo, Italy

[73] Assignee: TAM - S.R.L., Italy

[21] Appl. No.: 09/085,639

[22] Filed: May 27, 1998

[30] Foreign Application Priority Data

Jun. 6, 1997 [IT] Italy .................................. AN97A0031

[51] Int. Cl.[7] .................................................. B25G 3/00
[52] U.S. Cl. ........................ 403/234; 405/233; 405/260; 405/374.4
[58] Field of Search ..................................... 403/399, 398, 403/396, 394, 388, 234, 235, 205, 379.4, 379.3, 355, 233, 260, 258

[56] References Cited

U.S. PATENT DOCUMENTS

| | | | |
|---|---|---|---|
| 1,880,894 | 10/1932 | Dorman | 403/320 |
| 4,523,338 | 6/1985 | May | 403/378 |
| 4,901,970 | 2/1990 | Moss et al. | 403/385 |
| 5,184,911 | 2/1993 | Wu | 403/385 |
| 5,536,102 | 7/1996 | Kao | 403/320 |
| 5,609,436 | 3/1997 | Jou | 403/400 |

*Primary Examiner*—Lynne H. Browne
*Assistant Examiner*—Kenneth Thompson
*Attorney, Agent, or Firm*—Leonard Bloom

[57] ABSTRACT

This invention concerns a coupling for connecting two rods, said coupling being characterised by a cylindrical hollow body closed at one end with a jaw-shaped bottom wall and a clamp consisting of two jaws housed and sliding in a sleeve placed in a off-centre and slanted position with respect to said body.

4 Claims, 1 Drawing Sheet

COUPLING FOR CONNECTING TWO PERPENDICULAR RODS

This patent application concerns a coupling for connecting two orthogonal rods.

The coupling in question is designed expressly to resolve a specific requirement of keyboard players who generally use a stand for their keyboards.

These stands consist of a crossed pair of legs realised in general with tubular rods at whose ends an arm consisting of a bar having circular cross-section, is welded transversally.

The bottom pair of transverse arms obviously act as feet which support and stabilise the stand on the ground, while the upper pair of arms are used to support the keyboard.

These keyboard stands are often fitted with accessories which make it possible to place a second keyboard above the first, or to apply upright supporting rods to the stand arms for microphones, music-stands or lamps.

Although these accessories have different structures according to their function, they are all provided with an upright rod acting as a supporting element, which is fixed orthogonally to the two arms of the stand on which the keyboard is placed.

In order to fix the same, a metal sleeve is generally applied to the base of the upright element and positioned with its longitudinal axis orthogonal to the rod.

Said sleeve is dimensioned in order to fit precisely on the supporting arm of the keyboard and in order to prevent said sleeves from rotating freely around the relevant connection arm, each sleeve being provided with a radial dowel with relevant clamping knob.

The sleeve is therefore fixed firmly to the arm simply by friction due to forcing of the pieces caused by the pressure that the tip of the dowel exercises on the outer wall of the arm.

This fixing system is however far from safe and stable in that often the vibrations—to which the stand is inevitably subject when the keyboard is used or when the same is moved from one place to another—cause the fixing dowel to loosen in time consequently making the fixing of the sleeve to the arm unstable.

It was in order to resolve this problem that the coupling according to the invention was expressly designed, and which, though being as easy to use and inexpensive as the above couplings, however ensures a much more secure and stable fixing of the upright rod to the arm of the stand.

The coupling according to the invention consists of a cylindrical hollow body having horizontal axis, closed at one end with a bottom wall, whose outer side is shaped as a semi-cylindrical jaw, and whose longitudinal axis is vertical and thus perpendicular to that of the above cylindrical hollow body.

It should be noted that the upright rod with which all these accessories are provided, as mentioned above, may be embedded into said jaw.

The secure fixing of this upright rod is assured by means of a bolt fitted diametrically through the rod and screwed in a through hole at the centre of the bottom wall of the cylindrical hollow body.

This means that the upright rod must have a diametrical through hole into which the shank of the fixing bolt is fitted; said upright rods being in general provided with a series of regularly spaced diametrical holes which make it possible to regulate the height at which the accessory with respect to the keyboard below is fixed.

A sleeve having horizontal axis but orthogonal to that of the cylindrical hollow body being provided outside the lateral surface of said body, moulded in a single piece with the first.

It being provided that said outer sleeve virtually intersects said cylindrical body so that a single through slot having an almost elliptical arrangement is created on the inner wall of the cylindrical body, making the internal cavities of the sleeve and the cylindrical body in this way intercommunicating.

It being provided that the sleeve is fitted internally with a clamp consisting of two special jaws fitted and free to slide along the threaded shank of a bolt, whose nut is embedded in a fixing knob and whose hexagonal head houses precisely in a special housing realised on the outer face of one of the two jaws, and which are drawn together simply by screwing the nut along the threaded shank of the bolt.

Said two jaws consist substantially of two cylindrical rollers, bored axially so that the same may be fitted, one after the other, along the threaded shank of the above bolt; said two rollers being provided at their adjacent ends with a pair of deep specular notches, whose profile as a whole is arched, and centred in the above through slot, which makes the cavities of the cylindrical body and the outer sleeve intercommunicating.

Once the end section of one of the arms of the stand is fitted in the cavity of the cylindrical body it is sufficient to screw the fixing nut of the above bolt to draw the two jaws of the clamp together and consequently fix the arm, which is tightened firmly between the above pair of specular notches.

For major clarity the description of the invention continues with reference to the enclosed drawings which are intended for purposes of illustration and not in a limiting sense, where:

FIG. 1 is an axonometric view and exploded view of all the components of the coupling according to the invention.

With reference to the above figure, the coupling in question consists of a cylindrical body (1), having horizontal axis, closed only at one end by a bottom wall (2), provided at the centre with a threaded through hole (2a).

Said wall (2) being provided with an outer face (2b), shaped like a semi-cylindrical jaw, having vertical axis.

It being provided that a sleeve (3) having a smaller diameter, and placed in an off-centre and slanted position with respect to the body (1) is realised outside the cylindrical hollow body (1) in a single moulded piece with the body; in other words the axial hole (3a) of the sleeve (3) intersects the axial hole of the hollow body(1) perpendicularly, thereby forming a slot (4) which makes the inner holes of the hollow body (1) and the sleeve (3), intercommunicating.

It being provided that the axial hole (3a) of the sleeve (3) may house a pair of adjacent cylindrical rollers (5), bored axially, fitted and free to slide along the threaded shank (6a) of a bolt (6), whose hexagonal head (6b) is housed precisely in a conforming housing realised on the outer face of one of the two rollers (5), and which is also provided with an outer flange (5a), acting as abutment element against the mouth of the hole (3a) of the sleeve (3).

The nut fitted on the threaded shank (6a) of the bolt (6) is embedded in a fixing knob (7), which when screwed, gradually draws the above pair of rollers (5) together; said pair of rollers (5) being provided at their adjacent ends with a pair of deep specular notches (5b), whose profile as a whole is arched and housed in the above slot (4).

Said notches (5b) being provided with a splined surface which improves its hold.

This pair of rollers (5), having said specular notches (5b), create a pair of jaws which hold the arm (B) of the stand fitted in the hole of the hollow body (1), securely.

It also being provided that on the semi-cylindrical jaw (2b) of the coupling in question it is possible to fix an upright rod (A) by means of a bolt (8), provided with fixing knob (8a), whose threaded shank, after being fitted into a diametrical hole (F) of the rod (A), may be screwed into the above hole (2a), provided at the centre of the bottom wall (2) of the body (1).

Considering the above description which refers to the enclosed drawings, it is now evident that the coupling in question makes it possible to fix the upright rod (A) of an accessory for keyboard stands to the arms (B) on which the keyboard rests.

Obviously if the cross-section of the upright rod (A) is not circular, the profile of the jaw (2b) should also be changed so that it may be joined to that of the upright rod.

In addition, even if the coupling in question is expressly designed for keyboard stands, it may be used just as effectively in all those cases where it is necessary to fix the end of a cylindrical bar to a second bar, in an orthogonal direction to the first.

What is claimed is:

1. A coupling for a connection of two orthogonal unthreaded rods, characterized by:
   a cylindrical hollow body (1) having an axial hole along a first axis, said body being closed at only one end by an end wall (2) defining at the centre a threaded through hole (2a) and having a semi-cylindrical shaped outer face (2b) having a second axis perpendicular to said first axis;
   an outer sleeve (3) realized in a single moulding piece with said body (1) and disposed in an off-centre position with respect to said body (1) and defining an axial hole (3a), said axial hole (3a) of said sleeve (3) intersecting said axial hole of said body (1) perpendicularly, thereby creating a slot (4) intercommunicating with the axial holes (2a, 3a) of said hollow body (1) and said sleeve (3);
   a pair of adjacent cylindrical rollers (5) housed in said hole of said sleeve (3a); and
   a bolt (6) having a threaded shank (6a) and a shaped head (6b), said rollers (5) being disposed along said threaded shank 6(a);
   whereby said coupling is adapted to connect the two orthogonal unthreaded rods.

2. The coupling of claim 1 wherein said head (6b) is housed in a conforming housing realized on an outer face of one of the two rollers (5), and said roller defines an outer flange (5a) acting as abutment element against the hole (3a) of said sleeve (3); said two rollers (5) defining at the adjacent ends thereof a pair of deep specular notches (5b), said notches having an arched profile as a whole and being housed in said slot (4).

3. The coupling of claim 2 including:
   a nut embedded in a fixing knob (7) designed to be secured to said threaded shank (6a) of said bolt (6); and
   a bolt (8) having a head embedded in a fixing knob (8a) designed to be screwed into said threaded through hole (2a) of said body (2).

4. The coupling of claim 1 wherein said first axis is horizontal and said second axis is vertical.

* * * * *